March 31, 1964  V. F. KRAHN ETAL  3,126,691
ROW CROP FORAGE HARVESTER
Filed Sept. 11, 1961  3 Sheets-Sheet 3
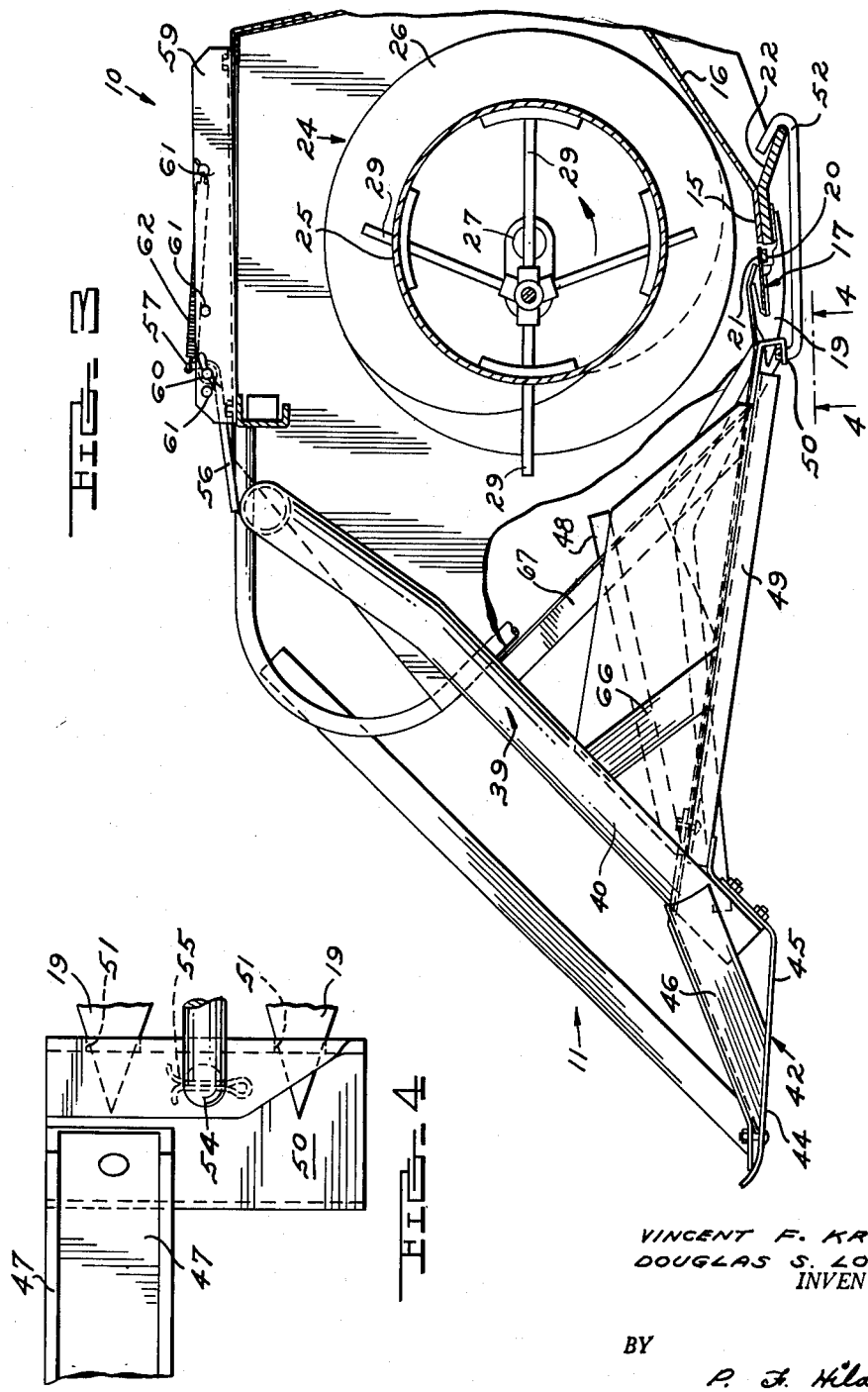
INVENTOR.
VINCENT F. KRAHN
DOUGLAS S. LOCK
BY
P. F. Hilder
ATTORNEY 3,126,691
Patented Mar. 31, 1964

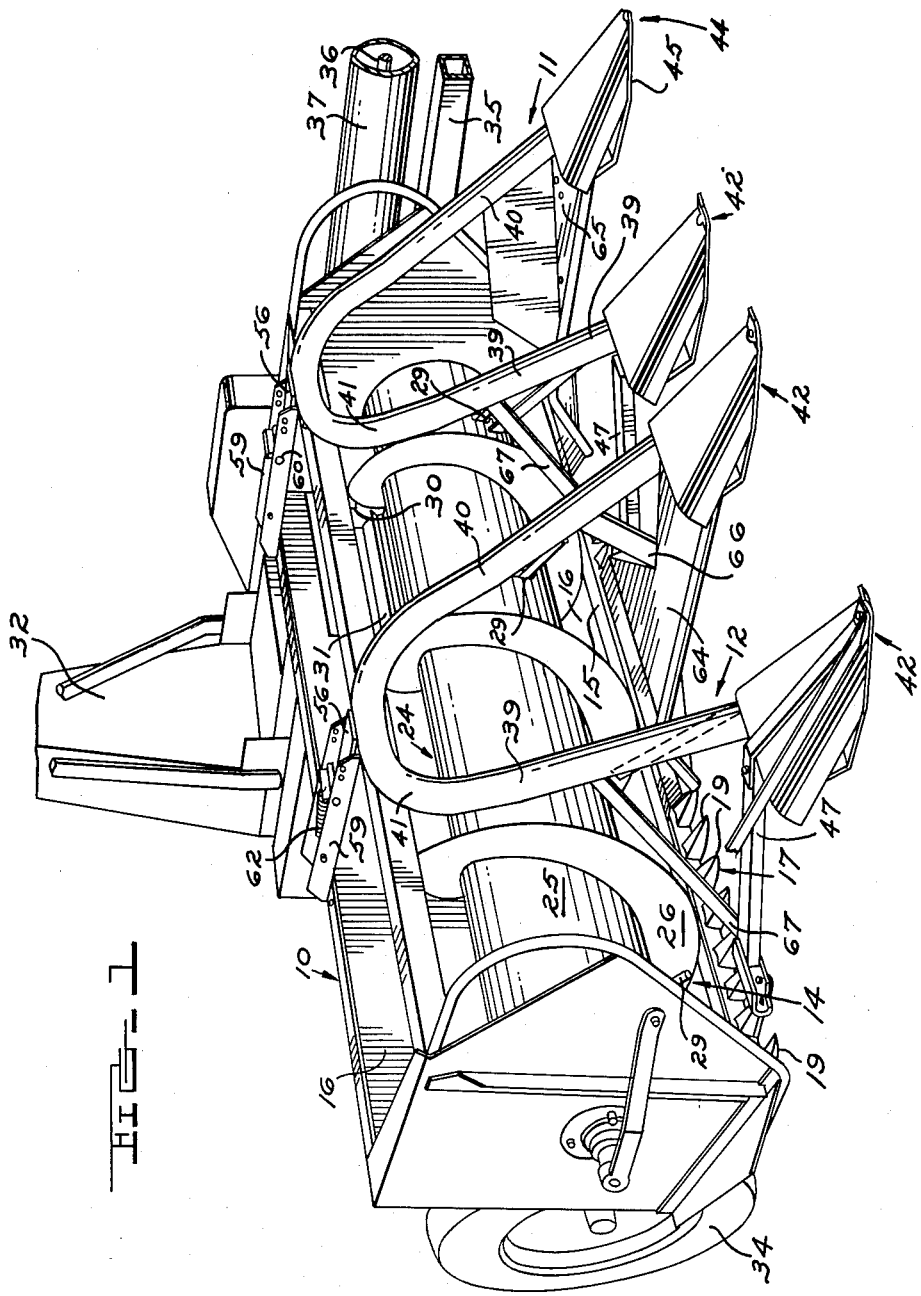

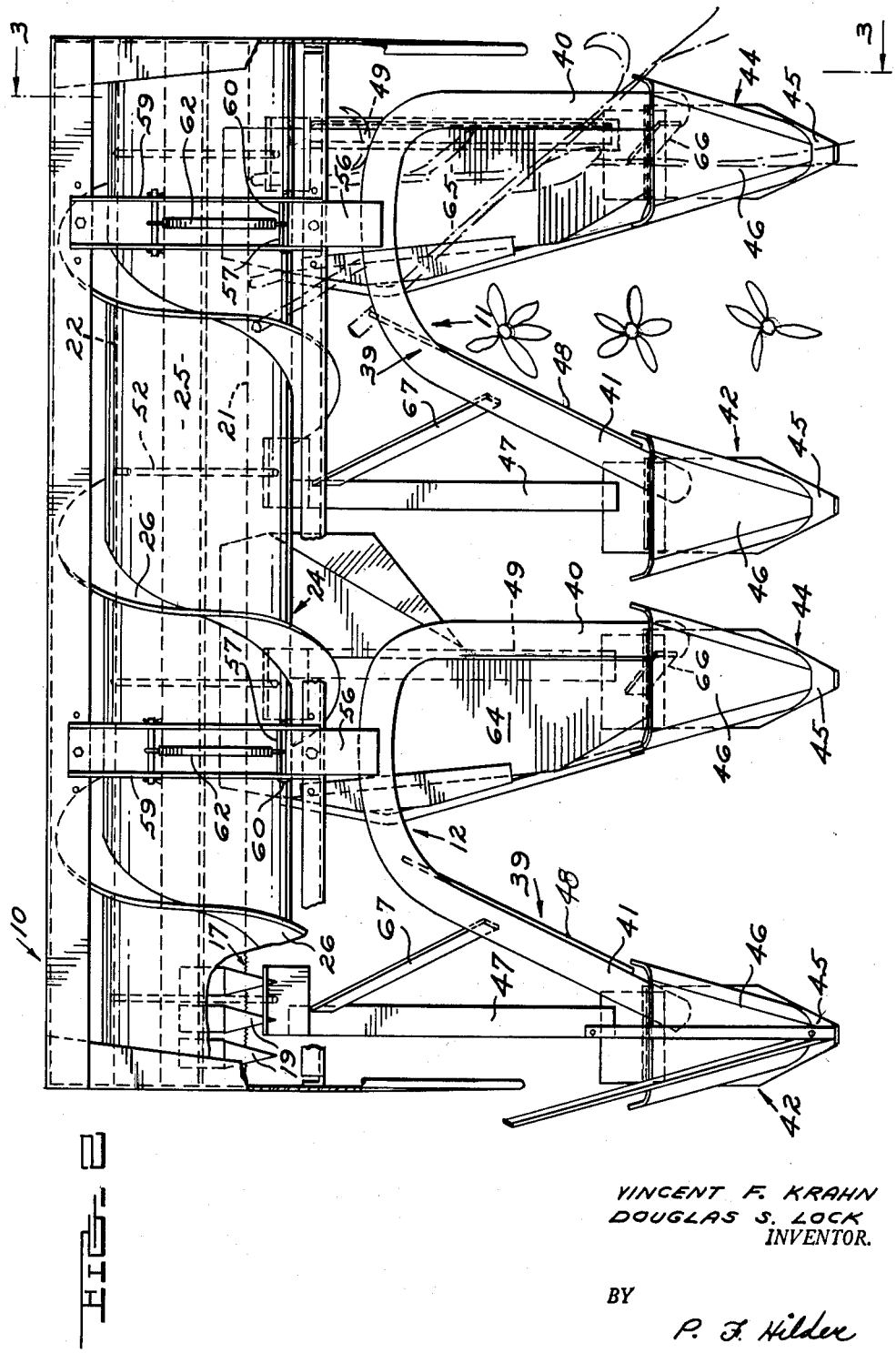
VINCENT F. KRAHN
DOUGLAS S. LOCK
INVENTOR.

3,126,691
ROW CROP FORAGE HARVESTER
Vincent F. Krahn and Douglas S. Lock, Birmingham, Mich., assignors to Ford Motor Company, Dearborn, Mich., a corporation of Delaware
Filed Sept. 11, 1961, Ser. No. 137,268
2 Claims. (Cl. 56—119)

This invention relates to forage harvesters, and more particularly to row crop forage harvesters.

Forage harvesters serve to sever a crop, elevate it, feed it to a chopper which cuts it into short, uniform lengths and then deliver the cut crop to a wagon. Forage harvesters basically are of two types, one type being adapted for grassland crops and the other type being adapted for harvesting crops planted in more or less uniformly spaced rows. The two types of machines customarily are obtained by mounting either a grassland header or row crop header on to the basic harvester machine.

The present invention is directed to a forage harvester of the row crop type. The embodiment shown includes a grassland forage harvester which is disclosed in detail in U.S. Patent Number 3,023,560 of Vincent F. Krahn. The row crop attachment of the present invention comprises a series of guides, one for each row, which merely are applied to the grassland harvester to convert it for row crop use, the crop guides cooperating with the cutter bar and feed auger to guide, sever and move the crop rearwardly for chopping.

Among the objects of the present invention are to provide a simplified row crop forage harvester, to provide such a forage harvester having few moving parts, to provide a row crop forage harvester in which all of the moving parts are embodied in a unitary grassland machine to which the row crop guides may be attached, and generally to improve forage harvesters of the type described.

Other objects, and objects relating to details of construction, will be apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 1 is a perspective view of a forage harvester according to the present invention, certain parts being broken away for convenience of illustration.

FIGURE 2 is an enlarged top plan view of the header portion of the forage harvester, certain of the parts being broken away to show details of construction.

FIGURE 3 is a vertical section of the header, taken generally along line 3—3 of FIGURE 2.

FIGURE 4 is an enlarged fragmentary bottom elevation indicating the method of attachment of one of the row crop guides to the forage harvester, taken on line 4—4 of FIGURE 3.

The forage harvester 10 embodying the present invention is a grassland forage harvester, to which one or more row crop guides 11 and 12 are attached, as will be explained in detail hereinafter. The grassland forage harvester 10, which is described in detail in the Vincent F. Krahn U.S. Patent Number 3,023,560, is for the purpose of harvesting and chopping grasses and other broadcast crops. This forage harvester includes a transversely extending feed platform 14 having a shelf-like, generally flat bottom portion 14 and a upwardly extending rear wall 16. A cutter bar 17, which may be of the more or less conventional sickle bar type, extends along the forward edge of the bottom portion 15 of the feed platform and includes a series of forwardly extending guards 19 and a reciprocating knife 20 carrying a series of ledger plates 21 (FIGURE 3). The cutter bar 17 is supported by a cutter bar frame 22, which is secured to the front of the bottom portion 15 of the feed platform.

The feed auger 24 extends along the feed platform immediately above the cutter bar. The feed auger 24 has a cylindrical body portion 25 and a radially extending helical flight 26. The feed auger 24 is rotated about a stationary shaft 27 in the direction indicated by the arrow of FIGURE 3 so as to sweep the underside of the auger rearwardly and laterally of the machine (longitudinally of the cutter bar).

The body portion 25 of the feed auger is provided with a series of retractable fingers or rods 29 which are extended a maximum when projecting horizontally forwardly and retracted when extended horizontally rearwardly, the fingers moving toward extended portion in the upper quadrants of the body portion and retracting in the lower quadrants. The retractable fingers are carried on the shaft 27. This retractable finger construction is generally similar to that shown in the Oehler U.S. Patent 2,529,180 of November 7, 1950.

An opening 30, which may be rectangular in outline, extends for substantially the full height of the rear wall 16 of the feed platform adjacent the right end thereof. A pair of cooperating feed rolls are located in the opening 30, one roll 31 being shown in FIGURE 1. The purpose of the feed rolls is to feed material entering the opening 30 rearwardly into a rotary chopper (not shown) at a uniform rate, the chopper serving to cut the crop into uniform lengths and throw it by centrifugal force up the delivery duct 32. The helical flight 26 of the feed auger is omitted opposite the opening 30 so that the feed auger will progress the crop as far as, but not beyond, the opening.

The retractable fingers 29 are located at intervals between the turns of the helical flight 26. Preferably, the retractable fingers are not uniformly distributed along the length of the body portion 25 of the auger, more fingers being located opposite the opening 30 than along other portions of the auger.

The forage harvester 10 is provided with a pair of ground wheels, one wheel 34 being shown, for supporting the harvester for towing behind a tractor. A forwardly extending tongue 35 is adapted to be connected to a tractor, and a power take off shaft 36 serves to drive the moving parts of the forage harvester through a drive disclosed in the aforementioned Patent Number 3,023,560. A shield 37 surrounds the PTO shaft 36.

The row crop guides 11 and 12 each comprise a rearwardly, upwardly inclined arch 39 which may be bent from a length of pipe and which extends from approximate ground level upwardly a short distance above the level of the top of the feed auger 24. The tops of arches 39 preferably are displaced somewhat to the right as viewed in FIGURE 2 to permit the crop to be carried to the right by the auger 24 as the crop is being fed through the opening 30. Preferably, the leg 40 of the arch 39 extends in a generally vertical fore and aft plane while the leg 41 of the arch is inclined to such plane.

A pair of gathering points 42 and 44 are located at the lower ends of each arch 39, the gathering points having a shoe 45 providing an extended surface for occasional contact with the ground and a deflector portion 46 above the shoe and overlying the lower ends of the arches, the inclination of the surface of the deflector being somewhat less than the inclination of the arch to aid in raising down corn.

Struts 47 and 49 extend rearwardly from the shoes 45 to support the lower ends of the arches 39 from the forage harvester. The rear ends of the struts 47 and 49 are provided with a short length of channel 50 having a series of spaced holes 51 for receiving the ends of the guards 19 (see FIGURE 4). A J-shaped rod 52 (FIGURE 3) is adapted to be hooked over the rear edge of the cutter bar frame 22, extends through a hole 54 in the channel 50, and is secured therein by a cotter pin 55 to hold the channel in position on the guards and thereby support the lower ends of the arches 39.

The upper ends of the arches 30 are supported by a rigid metal strap 56 fixed to the top of the arch by welding or otherwise and extending rearwardly, terminating in an upwardly extending flange 57. The rear end of the strap 56 is received within a channel 59 bolted to the forage harvester header. A transversely extending pin 60 may be placed in any one of several holes 61 in the flanges of the channel 59 to engage the flange 57 of the strap and limit forward rocking movement of the top of the arch about the engagement of the channel 50 with the cutter bar guards 19 as a center. The rearward hole 61 supports the pin 60 for holding the gathering points 44 elevated for transport, and the forward two holes 61 supports the gathering points in lowered position for operation.

If desired, a tension spring 62 may be placed between the flanges 57 of the channel and the strap 56 to counterbalance a portion of the weight of each guide 12 and provide a floating action of the gathering points. The rearward pull of the spring 62 on the strap 56 urges the strap rearwardly within the channel 59 and tends to rotate the row crop guide 11 or 12 about its attachment to the cutter bar guards. The spring 62 is insufficient in itself to lift the guide 11 or 12. Preferably, a series of laterally spaced holes is provided on the forage harvester header to provide for material adjustment of the channels 59 and permit the spacing between the arches 39 to be adjusted to coincide with different spacings of adjacent crop rows.

The leg 40 of each of the arches is provided with a generally horizontal shelf extending rearwardly from the gathering points 44 to the bottom portion 17 of the feed platform, the rear end of the shelf overlying the cutter bar. The shelf 64 of the left hand arch as viewed in FIGURE 1, is of somewhat greater lateral extent than the shelf of the right hand arch of FIGURE 1, inasmuch as the crop stalks entering the right hand arch pass directly rearwardly to the opening 30, while the stalks entering through the left hand arch are angled towards the opening 30 by the feed auger 24. The shelves 64 and 65 are supported by the struts 49 extending rearwardly from the gathering points 44. The legs 40 and 41 of each arch 39 are supported by diagonal braces 66 and 67 respectively, which extend forwardly and upwardly from the rear ends of the struts to the mid portions of the legs.

This row crop forage harvester is suitable for the harvesting and chopping of all row crops having stiff stalks, such as corn and sorghums. In operation of the machine, the space between the gathering points of each arch is kept generally centered on the row, the top of the arch engaging the stalk of the crop and inclining the crop forwardly somewhat before the crop is severed by the cutter bar 17.

At the time that the cutter bar 17 reaches and severs the base of the stalk, the stalk extends generally between the top of the arch and the cutter bar and is generally tangent to the cylindrical body portion 25 of the feed auger, the helical flight 25 of the auger being in position to engage the severed stalk above its butt end and move it laterally off the feed platform 14 towards the opening 30 at the rear wall thereof. This lateral movement of the stalk in such direction is facilitated by the deflector 46 which is secured only at its forward end, and therefore somewhat resilient, and by the displacement of the top of the arches 39 in a direction towards the feed opening 30. The effect is to roll the severed crop towards the feed opening (to the right as viewed in FIGURE 2) so as to remove the severed stalk from the patch of the succeeding stalks in the row entering the arches.

Rolling of the stalk to the right as viewed in FIGURE 2, deposits the stalk on the shelf 64 or 65, which aids in supporting the stalk as it is fed laterally and rearwardly towards and through the feed opening 30 in the rear wall of the header. The shelves also prevent contact of the stalks with the ground as the forage harvester moves forwardly.

The row crop entering the right hand arch 39 of FIGURE 2, generally opposite the opening 30 in the rear wall of the feed platform, is fed generally rearwardly, butt first, through the opening and to the chopper. The stalks, however, entering the right hand arch of FIGURE 2 must be inclined to the right to be fed to the opening 30. For this reason, the shelf 34 of the left hand arch has a greater lateral extent to the right to facilitate cross feeding of the stalk.

Feeding of the stalk is accomplished by a combination of the arches in front of the cutter bar with the cutter bar 17 and with the uger 24 having the retractable fingers 29. The action of the auger makes the conventional gathering chains completely unnecessary, so that the row crop guides 11 need contain no moving parts and there need be no complicated power train extending forwardly of the auger and cutter bar. Inasmuch as the auger and cutter bar also are utilized in the grassland forage harvester, they may be made an integral part of the machine, thereby simplifying the drive to these parts.

We claim:
1. A row crop forage harvester for corn and the like, comprising a transversely extending feed platform having a shelf-like bottom portion and an upwardly extending rear wall, a cutter bar of the sickle bar type extending along the forward edge of the platform and including a plurality of spaced, forwardly extending guards, a feed auger extending along the feed platform immediately above the cutter bar and having a radially extending spiral flight extending for at least a portion of the length of the auger to move material therealong, the spiral flight extending forwardly of the cutter bar, an opening in the rear wall of the feed platform, and a row crop guide comprising a pair of laterally spaced gathering points projecting forwardly from the guards, the space therebetween leading rearwardly to the cutter bar and forming an opening for reception of a standing crop, the gathering point on the side of the opening to which the auger feeds including a generally horizontal shelf extending forwardly from the cutter bar, the flight of the auger projecting above the shelf-like portion of the gathering point to displace the lower end of a stalk as it is cut and deposit the stalk on the adjacent shelf-like portion.

2. A row crop forage harvester for corn and the like, comprising a transversely extending feed platform having a shelf-like bottom portion and an upwardly extending rear wall, a cutter bar of the sickle bar type extending along the forward edge of the platform and including a plurality of spaced, forwardly extending guards, a feed auger extending along the feed platform immediately above the cutter bar and having a radially extending spiral flight extending for at least a portion of the length of the auger to move material therealong, the spiral flight extending forwardly of the cutter bar, an opening in the rear wall of the feed platform, and a row crop guide comprising plurality of pairs of laterally spaced gathering points projecting forwardly from the guards, the space between the points of each pair leading rearwardly to the cutter bar and forming an opening for reception of a standing crop, the gathering point on the side of the opening to which the auger feeds including a generally horizontal shelf extending forwardly from the cutter bar, the flight of the auger projecting above the shelf-like portion of the gathering point to displace the lower end of a stalk as it is cut and deposit the stalk on the adjacent shelf-like portion.

References Cited in the file of this patent

UNITED STATES PATENTS

| | | |
|---|---|---|
| 2,634,569 | Raney et al. | Apr. 14, 1953 |
| 2,867,961 | Heilbrun | Jan. 13, 1959 |
| 2,981,045 | Blanshine et al. | Apr. 25, 1961 |
| 3,023,560 | Krahn | Mar. 6, 1962 |